(12) United States Patent
Toida et al.

(10) Patent No.: US 8,737,807 B2
(45) Date of Patent: May 27, 2014

(54) REPRODUCTION APPARATUS AND IMAGE-CAPTURING APPARATUS

(75) Inventors: Maki Toida, Kokubunji (JP); Kensei Ito, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 96 days.

(21) Appl. No.: 13/328,690

(22) Filed: Dec. 16, 2011

(65) Prior Publication Data

US 2012/0163762 A1 Jun. 28, 2012

(30) Foreign Application Priority Data

Dec. 28, 2010 (JP) .................................. 2010-292331
Feb. 22, 2011 (JP) .................................. 2011-035741

(51) Int. Cl.
*H04N 9/80* (2006.01)

(52) U.S. Cl.
USPC ........... 386/241; 386/240; 386/343; 345/173; 345/474

(58) Field of Classification Search
USPC .................... 386/29–241, 248, 343; 348/207; 382/103, 106, 107; 345/173, 473, 474
See application file for complete search history.

(56) References Cited

FOREIGN PATENT DOCUMENTS

| JP | 05-108730 | 4/1993 | | |
|---|---|---|---|---|
| JP | 2004-104594 | 4/2004 | | |
| JP | 2004-178368 | 6/2004 | | |
| JP | 2006-050045 | 2/2006 | | |
| JP | 2009-043225 | * | 2/2009 | .............. G06F 3/048 |
| JP | 2010-198559 | * | 9/2010 | .............. G06T 3/00 |
| JP | 2010-213052 | * | 9/2010 | .............. H04N 5/225 |

OTHER PUBLICATIONS

Yajima et al., "Querying Video Data by Spatio-Temporal Relationships of Moving Object Traces." Jan. 2002.*
Chikashi, Yajima, et al., "Querying Video Intervals by Spatio-Temporal Relationships of Moving Object Traces," *IEIC Technical Report (Institute of Electronics, Information and Communication Engineers)*, vol. 101, No. 193, pp. 167-174 (Jul. 12, 2001).
Notification of Reasons(s) for Refusal for Japanese Patent Application No. 2011-035741, mailed Jul. 23, 2011 (3 pgs.) with translation (5 pgs.).

* cited by examiner

*Primary Examiner* — Thai Tran
*Assistant Examiner* — Mishawn Dunn
(74) *Attorney, Agent, or Firm* — John C. Pokotylo; Straub & Pokotylo

(57) ABSTRACT

A start position and an end position of a sliding operation along a direction in which the main subject moves in the video image is detected respectively as a first position and a second position. It is controlled so as to play a video image over a range between the first position and the second position. The video image constituted with the plurality of images starting with the first image and ending with the second image is played along a forward direction if the first image with the main subject at the first position precedes the second image with the main subject at the second position, and the video image constituted with the plurality of images starting with the first image and ending with the second image is played along a reverse direction if the first image follows the second image.

8 Claims, 9 Drawing Sheets

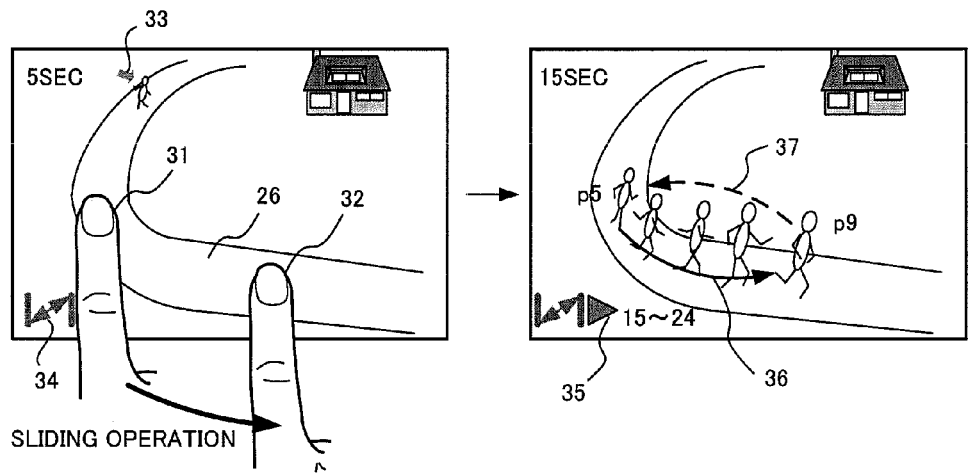
FIG. 3A
FIG. 3B
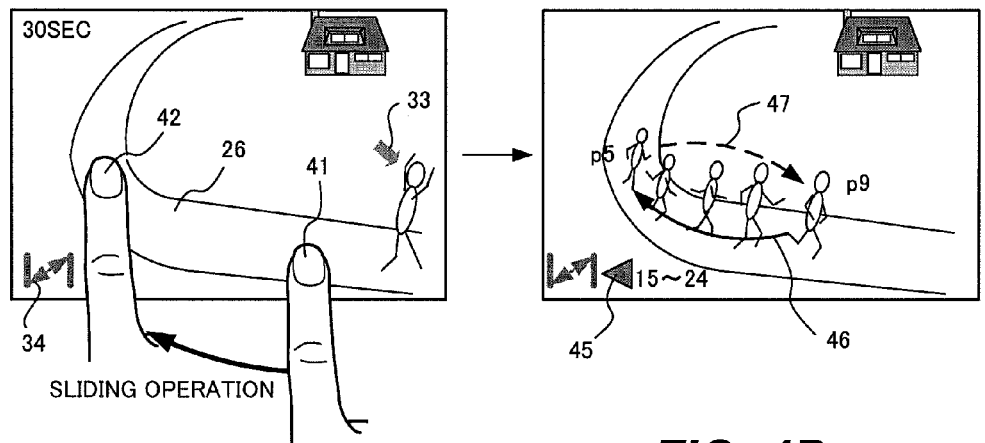
FIG. 4A
FIG. 4B

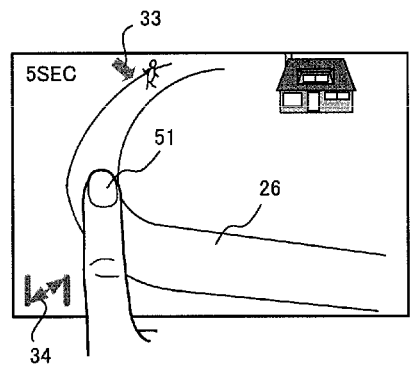 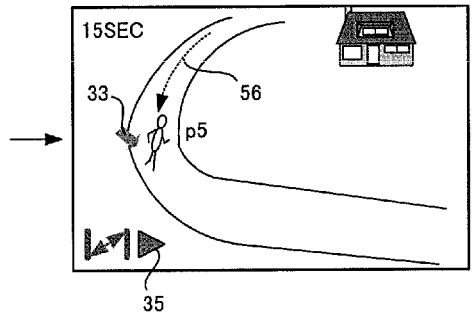
*FIG. 5A*  *FIG. 5B*
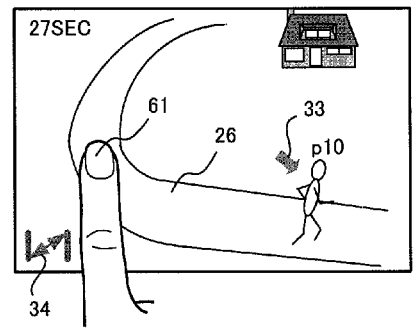 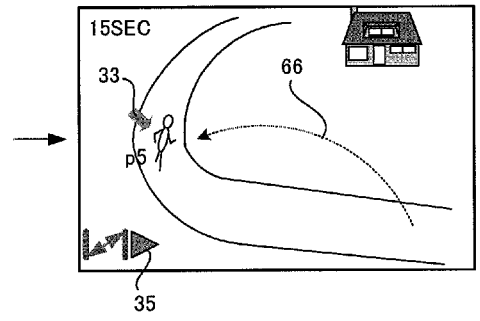
*FIG. 6A*  *FIG. 6B*

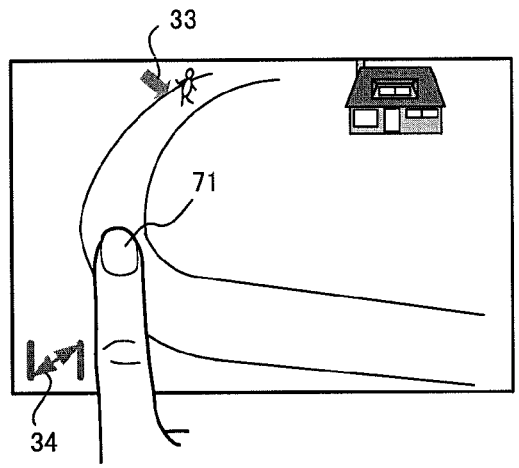 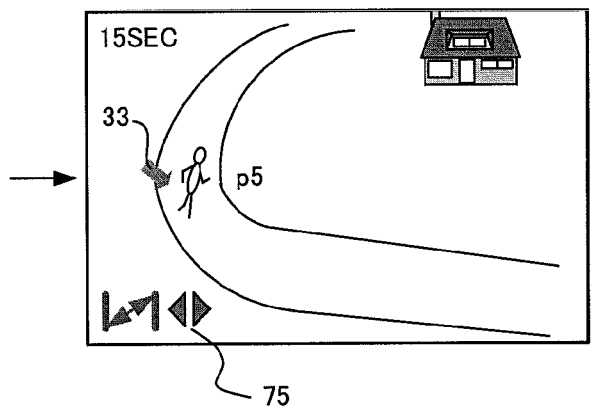
FIG. 7A  FIG. 7B
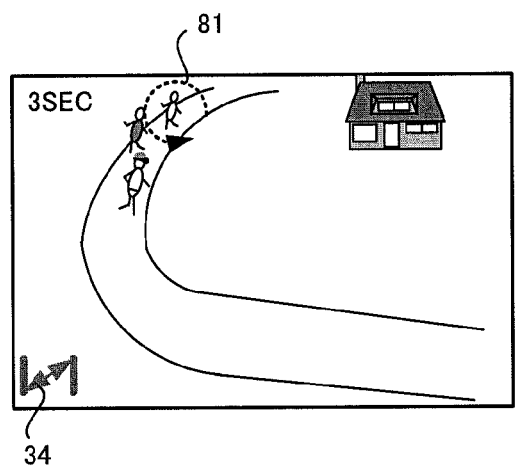
FIG. 8

ZOOMED IN

ZOOMED IN

REPRODUCTION APPARATUS AND IMAGE-CAPTURING APPARATUS

FIELD OF THE INVENTION

This invention relates to a technology that may be adopted when playing a dynamic image (video) from a cue point.

BACKGROUND OF THE INVENTION

There is a technology known in the related art that allows a user to view a targeted subject with ease by providing a side-by-side display of enlarged still images of the target subject extracted from a video (see JP 2004-178368A).

Since a full-length video often runs over a significant length of time, many viewers prefer to start watching the video halfway through or to watch only part of the video in order to save time. Conventionally, a viewer wishing to play only part of a video cues up a specific scene by fast forwarding or fast reversing the video and plays the video from the cue point. In addition, while there is a reproduction apparatus known in the related art capable of automatically cueing to a position appended with an index mark, the user of the reproduction apparatus needs to manually input the index mark at the particular position.

There is also a video digest creation method disclosed in the related art whereby scene change points are detected based upon audio data added to the video data, identifying silent scenes, conversation scenes and the like, and creating a digest version of the video based upon the identification results (see JP 2006-50045A).

SUMMARY OF THE INVENTION

A reproduction apparatus in an embodiment includes a reproduction control unit that controls reproduction of a video image, a display unit at which the video image being played is displayed, a touch panel unit disposed at the display unit, a main subject identifying unit that identifies a moving main subject among subjects captured in the video image, an operation detection unit that detects an input operation performed at the touchpad unit, a position detection unit that detects, respectively as a first position and a second position, a start position and an end position of a sliding operation performed as the input operation along a direction in which the main subject moves in the video image displayed at the display unit, and a specific image search unit that searches for images within a range starting with a first image in which the main subject is at the first position and ending with a second image in which the main subject is at the second position, among images constituting the video image. The reproduction control unit, which executes control so as to play a video image over a range between the first position and the second position, ensures that the video image constituted with the plurality of images starting with the first image and ending with the second image is played along a forward direction if the first image with the main subject at the first position precedes the second image with the main subject at the second position in a video shooting time sequence and that the video image constituted with the plurality of images starting with the first image and ending with the second image is played along a reverse direction if the first image with the main subject at the first position follows the second image with the main subject at the second position in a video shooting time sequence.

BRIEF DESCRIPTION OF THE DRAWINGS

FIGS. 3A and 3B provide an example of a jump reproduction display that may be brought up in the jump reproduction mode.

FIGS. 4A and 4B provide another example of a jump reproduction display that may come up in the jump reproduction mode.

FIGS. 5A and 5B provide yet another example of a jump reproduction display that may come up in the jump reproduction mode.

FIGS. 6A and 6B provide yet another example of a jump reproduction display that may come up in the jump reproduction mode.

FIGS. 7A and 7B provide yet another example of a jump reproduction display that may come up in the jump reproduction mode.

FIG. 8 illustrates an example of a specification method through which the user may specify the main subject.

DETAILED DESCRIPTION OF THE PREFERRED EMBODIMENT

Figure 1:
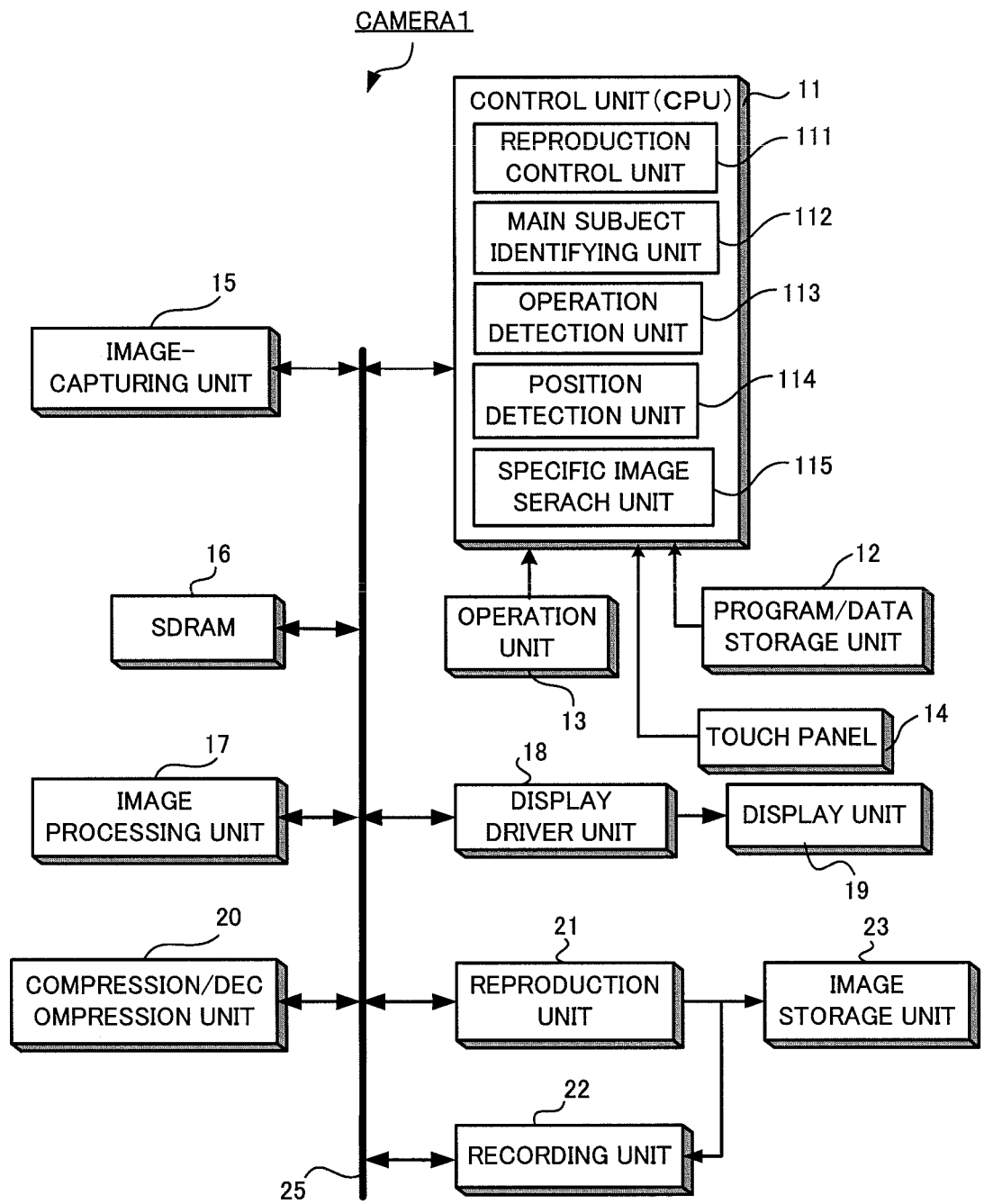
FIG. 1 is a block diagram showing the structure of a digital camera equipped with a reproduction apparatus achieved in an embodiment.

FIG. 1 is a block diagram showing the structure of a digital camera 1 equipped with a reproduction apparatus achieved in an embodiment. The digital camera 1 comprises a control unit 11, a program/data storage unit 12, an operation unit 13, a touch panel 14, an image-capturing unit 15, an SDRAM 16, an image processing unit 17, a display driver unit 18, a display unit 19, a compression/decompression unit 20, a reproduction unit 21, a recording unit 22, an image storage unit 23 and a bus 25. This digital camera 1 has a video shooting function.

The control unit (CPU) 11 executes overall control for the camera based upon a control program stored in the program/data storage unit 12. The control unit 11 includes a reproduction control unit 111, a main subject identifying unit 112, an operation detection unit 113, a position detection unit 114 and a specific image search unit 115. The reproduction control unit 111, the main subject identifying unit 112, the operation detection unit 113, the position detection unit 114 and the specific image search unit 115, which constitute part of the processing executed based upon the control program, will be described as functional units included in the control unit 11. The structure of the reproduction apparatus, the primary components of which are the control unit 11 described above and the display unit 19, will be described in detail later.

The reproduction control unit 111 executes reproduction control as the reproduction unit 21 reproduces an image, as described later.

The main subject identifying unit 112 identifies a dynamic subject within an image as a main subject, either automatically or in response to a user instruction. Such a dynamic subject may be, for instance, a person, an animal or a vehicle. If the user specifies a given subject, the subject specified by the user is designated as the main subject. In addition, if a plurality of dynamic subjects is detected without any main subject specified by the user, the main subject identifying unit 112 identifies a subject taking up the largest area as the main subject. As an alternative, the main subject identifying unit 112 may identify the most dynamic subject as the main subject instead of the largest subject.

The operation detection unit 113 detects an operation mode as well as operations performed by the user on the operation unit 13 and on the touch panel 14.

Based upon a contact position detected by the operation detection unit 113, at which the user has touched the touch panel 14, the position detection unit 114 detects the corresponding position in the image currently on display at the display unit 19. If the position at which the main subject is not currently present is specified through an input operation in the video image on display at the display unit 19, the position detection unit 114 detects the particular position as a specified position. In addition, the position detection unit 114 creates a main subject position movement locus by sequentially storing the main subject position, which changes from one image to another as the video is played. The main character position movement locus thus created is recorded into the image storage unit 23.

The specific image search unit 115 searches for an image containing the main subject taking up the specified position in the image through the plurality of images constituting the video currently on display at the display unit 19. At this time, the specific image search unit 115 may execute a limited image search so as to search through images over predetermined frame intervals (e.g., 10-frame intervals) or over predetermined time intervals (e.g., over 0.5-sec intervals) instead of searching through all the images constituting the video.

Depending upon the contents of the video, the main subject may move through the specified position in a plurality of images. While the plurality of images are eligible detection targets under such circumstances, the image having been shot the earliest is given top priority as the detection target by the specific image search unit 115. However, depending upon the situation, the image having been shot most recently may be given top priority as the detection target.

The program/data storage unit 12, the operation unit 13, the touch panel 14 and the bus 25 are connected to the control unit 11. Various types of data, as well as the program executed by the control unit 11 as explained earlier, are stored in the program/data storage unit 12.

The operation unit 13 includes various operation members operated by the user to issue instructions to the camera. The various operation members may include, for instance, a power button, a shutter release button, an OK button, a cross button, a play button and a telephoto/wide-angle button. The operating states of the various operation members included in the operation unit 13 are detected by the operation detection unit 113 in the control unit 11.

The touch panel 14, may be disposed in front of the display unit 19 or it may be configured as an integrated part of the display unit 19. As the user touches the screen of the display unit 19, the operation detection unit 113 detects the contact position and a touch direction along which the screen has been touched.

In addition to the control unit 11, the image-capturing unit 15, the SDRAM 16, the image processing unit 17, the display driver unit 18, the compression/decompression unit 20, the reproduction unit 21 and the recording unit 22 are connected to the bus 25.

The image-capturing unit 15 comprises a photographic lens via which a subject image is formed, an image sensor via which the subject image is converted to image data, processing circuits that operate in conjunction with the photographic lens and the image sensor, an aperture and a shutter disposed in an optical path of the photographic lens, and the like. Image data, generated by the image-capturing unit 15, which express a still image or consecutive images, are output to the bus 25.

The SDRAM 16 is a volatile temporary storage memory, in which stored data can be electrically overwritten. The SDRAM 16 is used to temporarily store the image data expressing a still image or consecutive images having been output from the image-capturing unit 15.

The image processing unit 17 executes various types of image processing such as digital amplification of digital image data (digital gain control processing), white balance adjustment, color correction, gamma (γ) correction, contrast correction, live view display image generation, video image generation and index image (reduced image) generation.

The compression/decompression unit 20 is a circuit via which image data expressing a still image or consecutive images, temporarily stored in the SDRAM 16, are compressed in a specific compression format such as JPEG or TIFF or compressed image data are decompressed for purposes of display or the like. It is to be noted that there is no particular restrictions imposed with regard to the image compression format and that this invention may be adopted in conjunction with a compression format other than JPEG, TIFF or MPEG.

The display driver unit 18, which is connected to the display unit 19, brings up an image on display at the display unit 19. The display unit 19 is a display device such as a liquid crystal monitor or an organic EL disposed on the rear side or the like of the camera body.

The reproduction unit 21 reproduces an image in response to an instruction issued from the reproduction control unit 111. In more specific terms, the reproduction unit 21 reads out the image data expressing the image having been chosen through the search executed by the specific image search unit 115 in the control unit 11, among the plurality of images constituting the video currently on display at the display unit 19. The image data thus read out are decompressed by the compression/decompression unit 20 and the image is reproduced and displayed at the display unit 19 based upon the decompressed image data.

Image data having been compressed by the compression/decompression unit 20 are recorded by the recording unit 22 into the image storage unit 23. The image storage unit 23, connected to the reproduction unit 21, may be an internal image data recording medium built into the camera body or it may be an image data recording medium that can be loaded into the camera body.

During a video reproduction, the digital camera 1 (reproduction apparatus) achieved in the embodiment may be set to a regular video reproduction mode or to a jump reproduction mode.

Figure 2A:
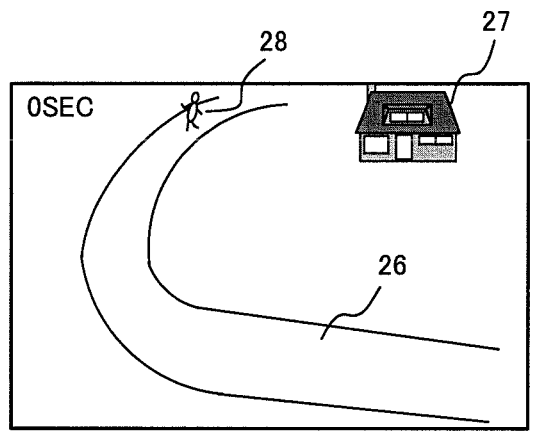
FIGS. 2A through 2C are figures for an explanation of a video image to be played.
Figure 2B:
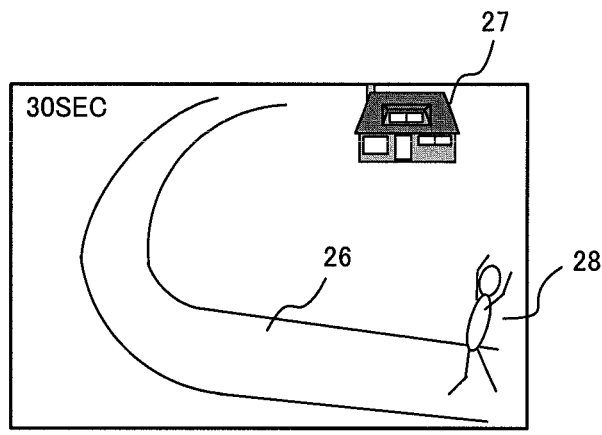
Figure 2C:
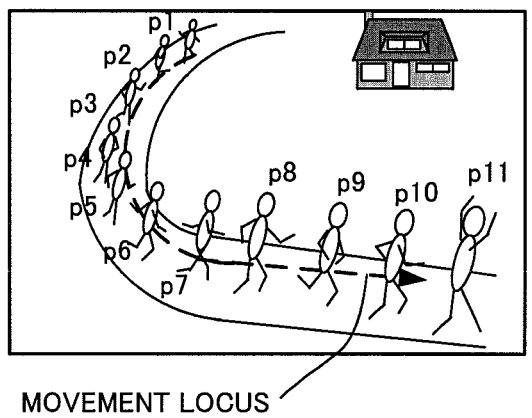

The following is a description of the jump reproduction mode. FIGS. 2A through 2C provide an example of a video image in reference to which the jump reproduction mode is explained below. FIG. 2A and FIG. 2B respectively show the image captured at the shooting start and the image captured at the shooting end, among the plurality of still images constituting the video being played. The shooting start image was captured at a time point t=0 (sec), whereas the shooting end image was captured at a time point t=30 (sec). In addition, the positions taken up by the main subject every three seconds are all indicated in FIG. 2C, so as to facilitate the following explanation. It is to be noted that FIG. 2C does not show an image that has actually been shot on the digital camera 1.

The main subject in FIGS. 2A through 2C is a person 28 who was captured running on a road 26. Namely, while each image contains the road 26, a house 27 and the person 28, the dynamic subject, i.e., the person 28, among these subjects, is identified as the main subject. As shown in FIG. 2C, the main subject takes up positions p1, p2, p3, p4, p5, p6, p7, p8, p9, p10 and p11 over 3-sec intervals during the period of time elapsing from the time point t=0 (sec) to the time point t=30 (sec).

FIGS. 3A and 3B provide an example of a jump reproduction display that may be brought up in the jump reproduction mode. FIG. 3A illustrates how a touch panel operation may be performed in order to play the video in the forward direction, whereas FIG. 3B shows a reproduction display that may be brought up in response to the touch panel operation shown in FIG. 3A. When the jump reproduction mode is set, an arrow icon 33 pointing to the main subject and an icon 34 indicating that the jump reproduction mode is in effect are displayed at the display unit 19, as shown in FIG. 3A.

The user touches a point on the road 26, through which the main subject is likely to pass, and then, while keeping his finger on the touch panel, he slides the finger to another point on the road 26. For forward reproduction, the user slides his finger along the direction in which the main subject moves. In the example in FIG. 3A, a finger 31 is at the sliding start position (first position) and a finger 32 is at the sliding end position (second position).

In response to a finger sliding operation such as that shown in FIG. 3A, the position detection unit 114 in the control unit 11 identifies positions on the image corresponding to the sliding start position and the sliding end position. The specific image search unit 115 then searches for an image in which the main subject takes up the sliding start position and an image in which the main subject takes up the sliding end position, among the plurality of images constituting the video currently on display at the display unit 19. In the example, the sliding start position corresponding to the finger 31 is the position p5 in FIG. 2C, whereas the sliding end position corresponding to the finger 32 is the position p9 in FIG. 2C.

The reproduction control unit 111 executes reproduction control for cued reproduction that starts with the image containing the main subject assuming the sliding start position. In more specific terms, it executes reproduction control for a loop reproduction of the part of the video constituted with the plurality of consecutive images lined up in the order of the shooting sequence, i.e., a video clip starting with the image with the main subject at the position p5 and ending with the image with the main subject at the position p9.

In the jump reproduction display, an icon 35 indicating that the jump reproduction display is in progress is brought up at the display unit 19, as shown in FIG. 3B. In addition, a reproduction time range of the video clip being played is displayed beside the icon 35. In the example in FIG. 3B, the reproduction time range 15 through 24, indicating that the reproduction time point for the image with the main subject at the position P5 is 15 seconds into the video and that the reproduction time point for the image with the main subject at the position P9 is 24 seconds into the video, is displayed.

It is to be noted that a solid-line arrow 36 in FIG. 3B indicates the direction along which the main subject moves in the jump reproduction display, whereas a dotted-line arrow 37 indicates that once the main subject reaches the position P9, the main subject resumes the position P5 so as to provide a loop reproduction. The arrows 36 and 37 are provided so as to facilitate the explanation and they are not actually displayed on the screen.

It is to be noted that instead of a loop reproduction, the video clip starting with the image in which the main subject is at position P5 and ending with the image in which the main subject is at the position P9 may be played only once.

FIGS. 4A and 4B provide another example of a jump reproduction display that may come up in the jump reproduction mode. FIG. 4A illustrates how a touch panel operation may be performed in order to play the video in the reverse direction, whereas FIG. 4B shows a reproduction display that may be brought up in response to the touch panel operation shown in FIG. 4A.

For reverse reproduction, the user slides his finger along the direction opposite from that in which the main subject moves. In the example in FIG. 4A, a finger 41 is at the sliding start position (first position) and a finger 42 is at the sliding end position (second position).

In response to a finger sliding operation such as that shown in FIG. 4A, the position detection unit 114 in the control unit 11 identifies positions on the image corresponding to the sliding start position and the sliding end position. The specific image search unit 115 then searches for an image in which the main subject takes up the sliding start position and an image in which the main subject takes up the sliding end position, among the plurality of images constituting the video currently on display at the display unit 19. In the example, the sliding start position is the position p9 in FIG. 2C, whereas the sliding end position is the position p5 in FIG. 2C.

The reproduction control unit 111 executes reproduction control for a cued reproduction that starts with the image containing the main subject assuming the sliding start position. In more specific terms, it executes reproduction control for a reverse loop reproduction of a video clip constituted with the plurality of consecutive images lined up in the order of the shooting sequence, from the image with the main subject at the position p5 through the image with the main subject at the position p9. In a reverse reproduction, the images constituting the video clip are played in reverse order, opposite from the order in which they were captured. In other words, the video clip is played starting with the image in which the main subject is at position P9 and ending with the image in which the main subject is at position P5. In FIG. 4B, a solid-line arrow 46 indicates the direction along which the main subject moves in the reverse reproduction display, whereas a dotted-line arrow 47 indicates that once the main subject reaches the position P5, the main subject resumes the position P9 so as to provide a loop reproduction.

During reverse reproduction, an icon 45 indicating that a reverse reproduction is in progress is also displayed. While the icon 35 indicating forward reproduction points to the right, the icon 45 indicating reverse reproduction points to the left. These icons 35 and 45 allow the user to determine at a glance whether a forward reproduction or a reverse reproduction is currently in progress.

It is to be noted that instead of a loop reproduction, the video clip starting with the image in which the main subject is at position P9 and ending with the image in which the main subject is at the position P5 may be played only once in the reverse reproduction, as well.

FIGS. 5A and 5B provide yet another example of a jump reproduction display that may come up in the jump reproduction mode. FIG. 5A illustrates how the user may perform a touch panel operation in order to fast-forward the video to a specified position, whereas FIG. 5B shows a reproduction display that may be brought up in response to the touch panel operation shown in FIG. 5A. A fast-forward reproduction is executed if a position of the subject later in time relative to the position of the subject in the current display is specified.

In order to play the video in fast forward to the point at which the main subject is at a desired position, the user needs to "double tap" the desired position (specific position) to which he wishes to move the main subject relative to the current position of the main subject in the video being played. The term "double tap" is used to refer to an operation whereby the user quickly taps the touch panel 14 twice. In FIG. 5A, a finger 51 indicates the position at which it has tapped the touch panel twice.

In response to a double tap operation performed as shown in FIG. 5A, the position detection unit 114 in the control unit 11 identifies the position on the image that corresponds to the position at which the double tap operation has been performed. The specific image search unit 115 searches through the plurality of images constituting the video currently on display at the display unit 19 for an image in which the main subject is at the position having been double tapped. It is assumed that the position P5 in FIG. 2C has been double tapped in this example.

The reproduction control unit 111 executes reproduction control so as to play the video in fast-forward up to the image in which the main subject is at the double tapped position and then play the video at normal speed starting with the image with the main subject at the double tapped position. Namely, the reproduction control unit 111 executes cued reproduction control under which the image with the main subject at the double tapped position is designated as a video reproduction start image.

FIG. 5B shows the video fast forwarded to the double tapped position. An arrow 56 in FIG. 5B indicates that the video has been played in fast-forward to the image in which the main subject is at the position P5. In other words, the video has been played in fast-forward from the image corresponding to a reproduction time point 5 (sec) (see FIG. 5A) to the image corresponding to a reproduction time point 15 (sec) (see FIG. 5B). It is to be noted that the video reproduction may start with the image at the specified position without playing the video in fast-forward to the specified position.

FIGS. 6A and 6B provide yet another example of a jump reproduction display that may come up in the jump reproduction mode. FIG. 6A illustrates how the user may perform a touch panel operation in order to reverse the video to a specified position, whereas FIG. 6B shows a reproduction display that may be brought up in response to the touch panel operation shown in FIG. 6A. A reverse reproduction is executed if a position of by the subject earlier in time relative to the position of the subject in the current display is specified.

In order to play the video in reverse to the point at which the main subject is at a desired position, the user needs to "double tap" the desired position (specific position) to which he wishes to move the main subject in the reverse direction relative to the current position of the main subject in the video being played. In FIG. 6A, a finger 61 indicates the position at which it has tapped the touch panel twice.

In response to a double tap operation performed as shown in FIG. 6A, the position detection unit 114 in the control unit 11 identifies the position on the image that corresponds to the position at which the double tap operation has been performed. The specific image search unit 115 searches through the plurality of images constituting the video currently on display at the display unit 19 for an image in which the main subject is at the position of the double tap. It is assumed that the position P5 in FIG. 2C has been double tapped in this example.

The reproduction control unit 111 executes reproduction control so as to play the video in reverse to the image in which the main subject is at the double tapped position and then start a regular video reproduction from the image in which the main subject is at the double tapped position. Namely, the reproduction control unit 111 executes cued reproduction control under which the image with the main subject at the double tapped position is designated as a video reproduction start image.

FIG. 6B shows the video reversed to the double tapped position. An arrow 66 in FIG. 6B indicates that the video has been played in reverse to the image in which the main subject is at the position P5. In other words, the video has been played in reverse from the image corresponding to a reproduction time point 27 (sec) (see FIG. 6A) to the image corresponding to the reproduction time point 15 (sec) (see FIG. 6B).

FIGS. 7A and 7B provide yet another example of a jump reproduction display that may come up in the jump reproduction mode. FIG. 7A illustrates a touch panel operation that may be performed in order to display the image with the main subject at a specified position as a still image, whereas FIG. 7B illustrates a reproduction display that may be brought up in response to the touch panel operation performed as shown in FIG. 7A.

In order to bring up a still image display of the image in which the main subject is at the specified position, the user needs to hold his finger at the specified position over a predetermined length of time or longer. The predetermined length of time may be, for instance, one second. FIG. 7A shows a sustained touch operation whereby a finger 71 is held at a given position for the predetermined length of time or longer.

In response to a sustained touch operation performed as shown in FIG. 7A, the position detection unit 114 in the control unit 11 identifies the position on the image corresponding to the position at which the sustained touch operation has been performed. The specific image search unit 115 searches for an image in which the main subject is at the position having been held over the predetermined length of time or longer through the plurality of images constituting the video image currently on display at the display unit 19. It is assumed that the position at which the sustained touch operation has been performed is the position P5 in FIG. 2C in this case.

The reproduction control unit 111 executes reproduction control so as to reproduce the image selected through the search by the specific image search unit 115 as a still image. FIG. 7B shows the image in which the main subject is at the position that has been held with the finger 71 over an extended length of time, displayed at the display unit 19. An icon 75 indicating that a still image of the main subject at the specified position is currently on display is also displayed at the display unit 19. This icon 75 takes on an appearance that may be achieved by combining the forward reproduction icon 35 and the reverse reproduction icon 45. Then, as the user touches the main subject again in the still image on display, the video reproduction resumes.

The main subject can be specified by the user. FIG. 8 illustrates an example of a specification method through which the user may specify the main subject. In this example, the user circles the subject he wishes to specify as the main subject, among the three subjects, on the touch panel. A dotted line 81 in FIG. 8 indicates the subject having been circled with the user's finger. The main subject identifying unit 112 in the control unit 11 identifies the main subject based upon detection results provided by the operation detection unit 113 and detection results provided by the position detection unit 114.

However, the user may specify the main subject through a method other than that shown in FIG. 8. For instance, a subject directly touched by the user's finger may be identified as the main subject.

Figure 9:
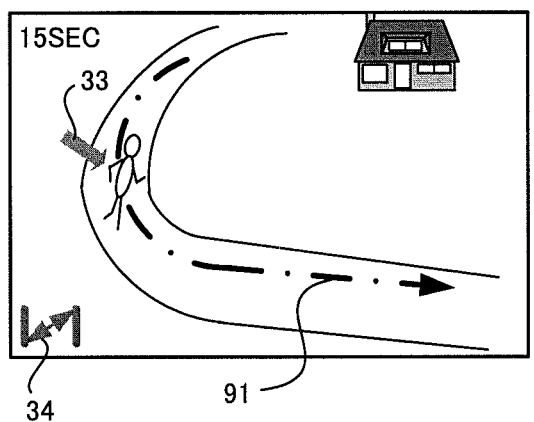
FIG. 9 shows a main subject movement locus having been created during the video reproduction, superimposed on the image displayed at a display unit.

In addition, once the video is played to the end in the jump reproduction mode, the main subject movement locus, having been obtained during the reproduction, may be brought up on display at the display unit 19. The main subject movement locus is created by sequentially storing the positions of the main subject in the images constituting the video during the reproduction. FIG. 9 shows a main subject movement locus 91 having been created during the video reproduction, superimposed on the image displayed at the display unit 19. The user, viewing the superimposed display of the main subject movement locus 91 provided at the display unit 19, is able to visualize the positions that the main subject passes through and thus is able to perform the touch operation described earlier with greater certainty. It is to be noted that the display mode may be switched to a mode in which the movement locus is not displayed.

In order to simplify the description, an explanation has been given on an example in which the shooting direction or the zoom ratio remains practically unchanged through the video shooting operation. However, the main subject can be identified even in a video image obtained through a shooting operation during which the shooting direction or the zoom ratio changes.

Figure 10A:
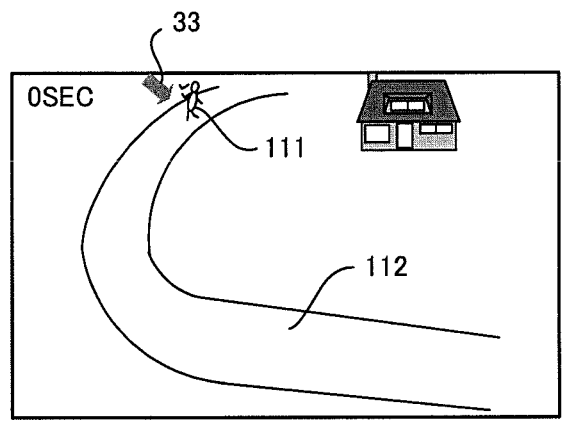
FIGS. 10A through 10C illustrate a method that may be adopted when identifying the main subject in a video shot along varying shooting directions or with varying zoom ratios.
Figure 10B:
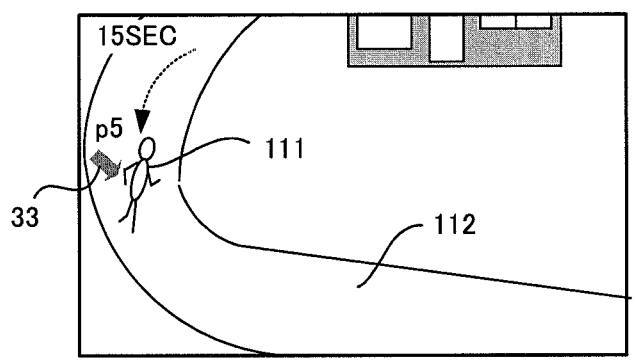
Figure 10C:
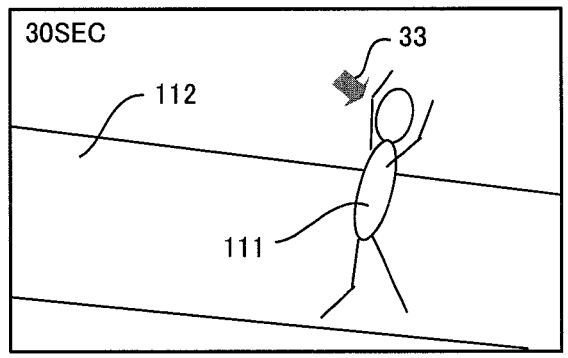

FIGS. 10A through 10C illustrate a method that may be adopted when identifying the main subject in a video shot along varying shooting directions or with varying zoom ratios. FIG. 10A shows the image corresponding to a reproduction time point 0 (sec), i.e., the image at the video shooting start. In addition, FIG. 10B shows the image corresponding to a reproduction time point 15 (sec), whereas FIG. 10C shows the image corresponding to a reproduction time point 30 (sec). as FIGS. 10A, 10B and 10C indicate, as the shooting time advances, the field of view is zoomed in on the main subject.

Even when the shooting direction or the zoom ratio changes, the main subject can be identified through a method of the known art based upon the shape or color of the subject in the images. In the example provided in FIGS. 10A through 10C, a main subject 111 is identified based upon, for instance, the shape or the color of a road 112, the shape or the color of the subject 111 and the like. While the background changes throughout the video as the shooting direction or the zoom ratio changes during the shooting operation, the correspondence among the backgrounds in different images can be determined based upon the shapes and colors included in the backgrounds. For instance, once the road 112 in FIG. 10A and the road 112 in FIG. 10C are determined to be one and the same, the correspondence among FIG. 10A→FIG. 10B→FIG. 10C can be determined. Through these measures, even if a position near the lower right corner of the image in FIG. 10A is specified, the specified position can be determined to be a position corresponding to that substantially near the center in the image shown in FIG. 10C.

In addition, while the specified position is defined as "a position in the image currently displayed at the display unit" in the description provided above, the specified position may be otherwise termed as "a physical position on the display unit". This means that as long as the shooting direction and the zoom ratio remain substantially constant, there is no difference between "the position in the image currently displayed at the display unit" and "the physical position on the display unit". However, if the shooting direction or the zoom ratio changes partway through the shooting operation the "the position in the image currently displayed at the display unit" and the "the position on the display unit" will no longer match.

Namely, in the example described earlier, as a position in the lower right corner of the screen of the display unit is specified, "the position in the lower right corner of the image on display at the time of specification" is designated as the specified position and, accordingly, the specific image search unit 115 searches for an image in which the specified subject is present at "the position in the lower right corner of the image on display at the time of specification".

However, if the specified position is defined as "a physical position on the display unit", the specific image search unit 115 searches for an image with the specified subject present at the position in the lower right corner of the display unit screen. The two different definitions of the specified position may be options either of which the user is allowed to select in advance so that the specific image search unit 115 will search for an image in accordance with the selected definition of the specified position.

Figure 11:
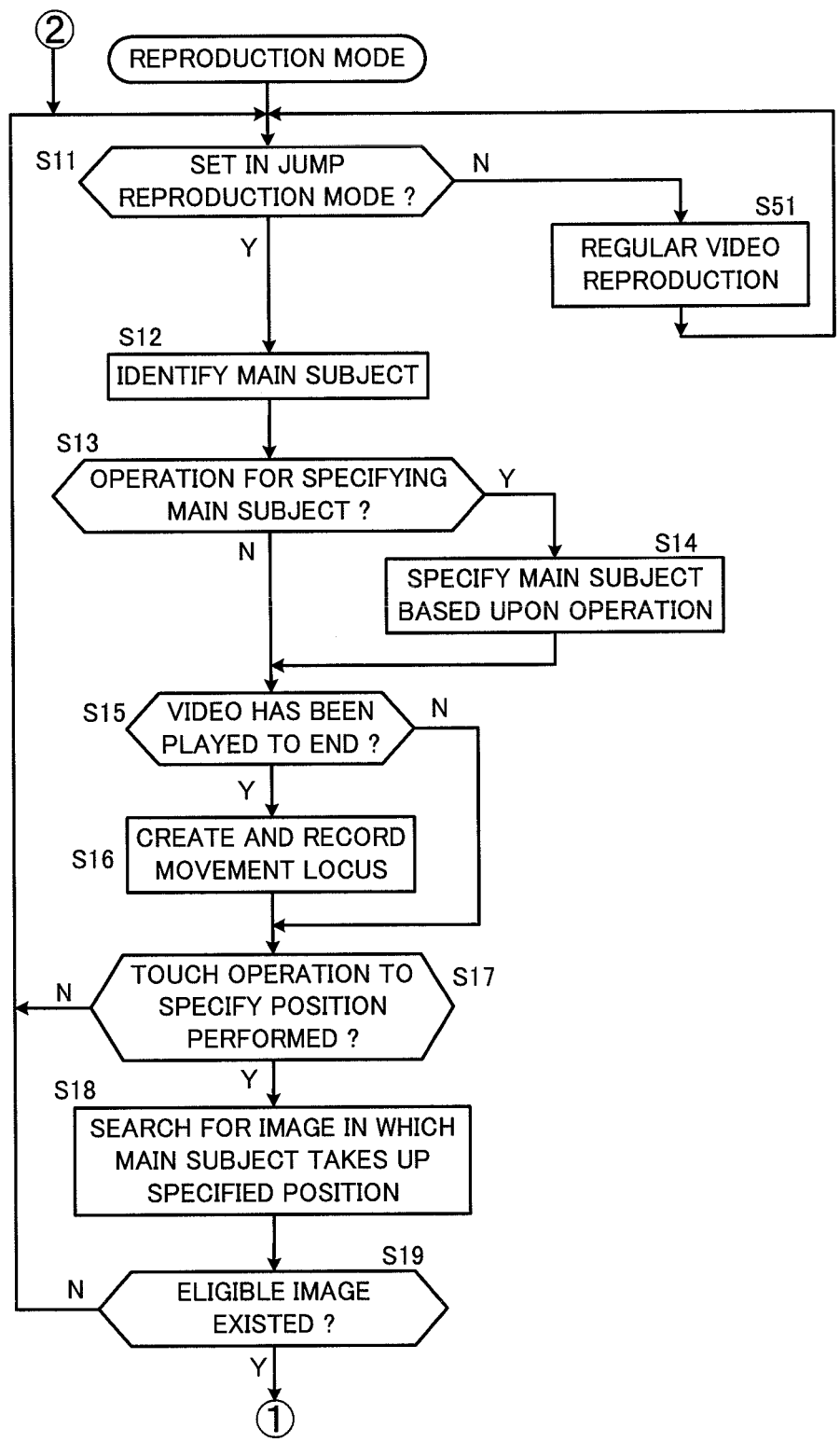
FIG. 11 is a flowchart of the processing executed in the digital camera equipped with the reproduction apparatus achieved in the embodiment.

FIG. 11 is a flowchart of the processing executed in the digital camera 1 equipped with the reproduction apparatus achieved in the embodiment. Once the digital camera 1 is set in a reproduction mode for still image•video reproduction, the control unit 11 reads out reproduction target video data from the image storage unit 23 and starts video reproduction processing.

In a step S11, a determination is made as to whether or not the digital camera 1 is currently set in the jump reproduction mode. Upon determining that the digital camera 1 is set in the jump reproduction mode, the operation proceeds to a step S12.

In the step S12, the main subject identifying unit 112 identifies, based upon the plurality of images constituting the reproduction target video, a dynamic subject as the main subject. The main subject may be identified based upon, for instance, images constituting the first several seconds of the video among the plurality of images constituting the reproduction target video. As explained earlier, if a plurality of dynamic subjects is detected, the subject taking up the greatest area may be identified as the main subject or the most dynamic subject may be identified as the main subject.

In a step S13, a determination is made as to whether or not the user has performed an operation for specifying the main subject. The user may specify the main subject by, for instance, encircling a specific subject with his finger as has been explained earlier in reference to FIG. 8. If no main subject has been identified or if the intended subject has not been identified, a main subject specifying operation is performed. If the operation detection unit 113 detects a main subject specifying operation, the operation proceeds to a step S14, whereas if the operation detection unit 113 does not detect a main subject specifying operation, the operation proceeds to a step S15.

In the step S14, the main subject identifying unit 112 identifies the main subject based upon the user operation. For these purposes, the position detection unit 114 detects the corresponding position on the image on display based upon the contact position on the touch panel 14 having been detected by the operation detection unit 113. Then, based upon the position on the image detected by the position detection unit 114, the main subject identifying unit 112 identifies the main subject. If the user has circled a specific subject, as has been explained in reference to FIG. 8, the position detection unit 114 detects a plurality of positions delineating the circle and the subject surrounded by the plurality of detected positions is identified as the main subject. At this time, the video image may be put on pause.

In the step S15, a determination is made as to whether or not a main subject movement locus has been recorded. Upon determining that the reproduction target video has been previously played to the end and that the main subject movement locus has been thus recorded, the operation proceeds to a step S17, whereas upon determining that no movement locus has been recorded, the operation proceeds to a step S16.

In the step S16, the position detection unit 114 creates a main subject movement locus, along which the main subject moves from image to image, as the video advances. The main subject movement locus thus created, which is recorded into the image storage unit 23, may also be provided in a superimposed display at the display unit 19, as shown in FIG. 9, in the jump reproduction mode. If a main subject, the movement locus of which has already been recorded, is identified, the operation will naturally skip the processing in the step S16. In addition, even if the video has not been played to the end, a movement locus up to the position to which the video has been played may be recorded.

In the step S17, a determination is made as to whether or not the user has performed a touch operation to specify a position on the screen. If the operation detection unit 113 detects a touch operation performed to specify a position on the screen, the operation proceeds to a step S18, whereas if a touch operation for specifying a position has not been detected, the operation returns to the step S11.

In the step S18, a search for an image in which the main subject takes up the specified position, among the plurality of images constituting the display target video, is conducted. For these purposes, the position detection unit 114 detects the corresponding position in the image currently on display at the display unit 19 based upon the contact position at which the user has touched the touch panel 14. The specific image search unit 115 searches for an image with the main subject taking up the specified position on the image through the plurality of images constituting the display target video.

In a step S19, a determination is made based upon results of the image search processing executed in the step S18 as to whether or not an eligible image exists. Upon determining that no eligible image exists, the operation returns to the step S11, whereas upon determining that an eligible image exists, the operation proceeds to a step S21 in FIG. 12.

It is to be noted that the user viewing a superimposed display of the movement locus brought up at the display unit 19 will specify a position on the movement locus and thus, the likelihood of determining that an image with the main subject taking up the specified position does not exist will be low under such circumstances.

If it is determined in the step S11 that the digital camera 1 is not currently set in the jump reproduction mode, the operation proceeds to a step S51.

In the step S51, a regular video reproduction is executed.

Figure 12:
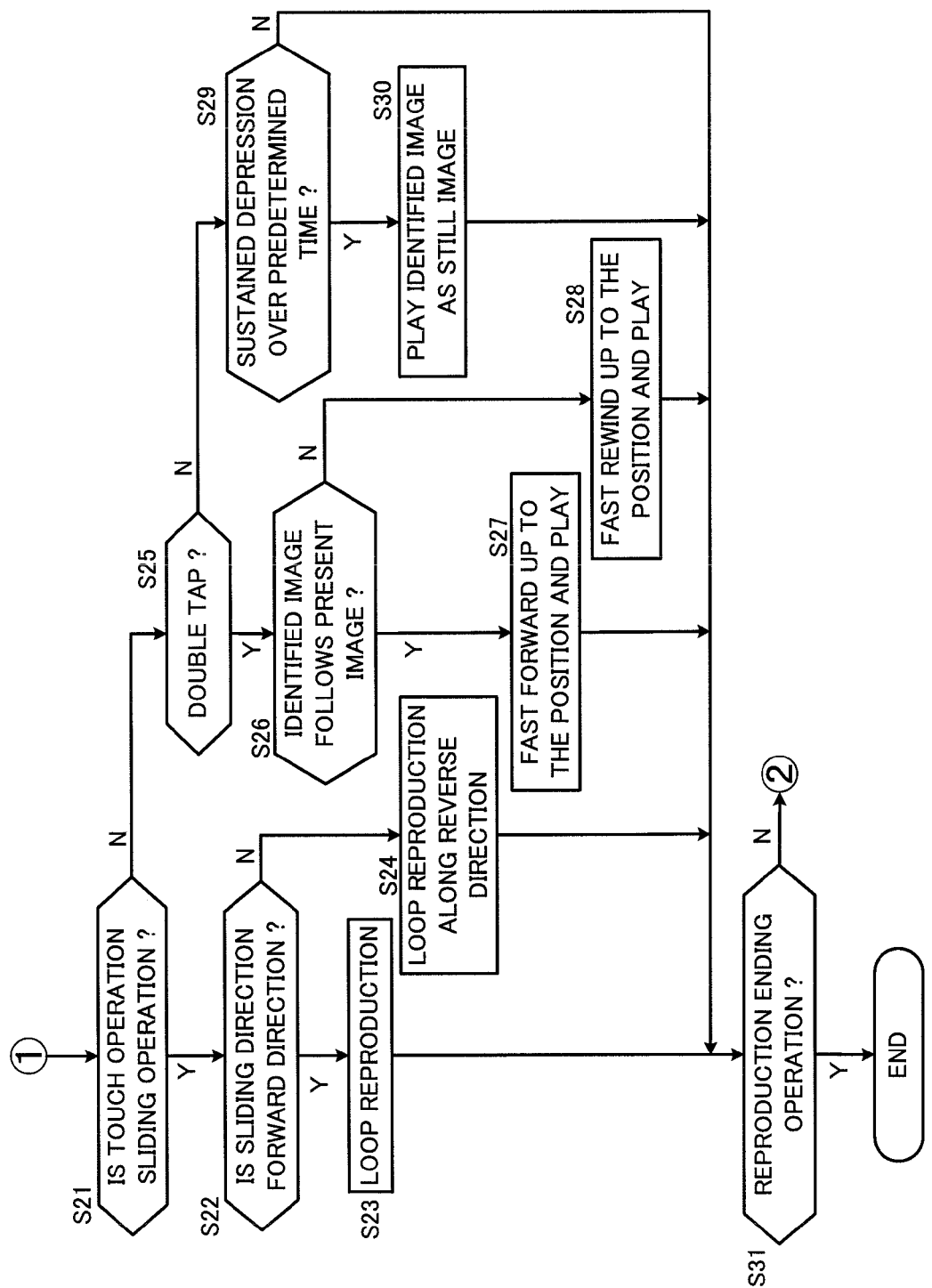
FIG. 12 is a flowchart continuing after the flowchart of FIG. 11.

In the step S21 in FIG. 12, a determination is made as to whether or not the touch operation having been performed by the user has been sliding operation over the touch panel 14. Upon determining that the touch operation has been a sliding operation, the operation proceeds to a step S22.

In the step 822, a determination is made as to whether or not the user's finger has been slid along the forward direction, i.e., along a direction matching the direction in which the main subject moves. Upon determining that the user's finger has been slid along the forward direction, the operation proceeds to a step 823.

In the step S23, the reproduction control unit 111 executes reproduction control for a loop reproduction so as to repeatedly play the video clip, constituted with a plurality of images starting with the image in which the main subject takes up the sliding operation start position and ending with the image in which the main subject takes up the sliding operation end position, along the forward direction (see FIG. 3B).

In the step S22, a determination is also made as to whether or not the user's finger has been slid along the reverse direction, i.e., along a direction opposite the direction in which the main subject moves. Upon determining that the user's finger has been slid along the reverse direction, the operation proceeds to a step S24.

In the step S24, the reproduction control unit 111 executes reproduction control for a loop reproduction so as to repeatedly play the video clip, constituted with a plurality of images starting with the image in which the main subject takes up the sliding operation start position and ending with the image in which the main subject takes up the sliding operation end position, along the reverse direction (see FIG. 4B). As a specific operation is performed to cancel the loop reproduction while the processing in the step S23 or in the step S24 is underway, the regular video reproduction is immediately resumed and the operation proceeds to a step S31. If the loop reproduction setting has not been selected as described earlier, the operation proceeds to the step S31 after completing a single reproduction.

If, on the other hand, it is determined in the step S21 that the touch operation performed by the user at the touch panel 14 has not been a sliding operation, the operation proceeds to a step S25. In the step S25, a determination is made as to whether or not the touch operation performed by the user at the touch panel 14 has been a double tap operation. Upon determining that the touch operation was a double tap operation, the operation proceeds to a step S26.

In the step S26, a determination is made as to whether or not the image with the main subject at the double tapped position follows the image currently on display in the shooting time sequence. The image with the main subject at the double tapped position is the image having been selected through the search executed in the step S18 in FIG. 11. Upon determining that the image with the main subject at the double-tapped position follows the image currently on display in the shooting time sequence, the operation proceeds to a step S27, whereas upon determining that the image precedes the image currently on display in the shooting time sequence, the operation proceeds to a step S28.

In the step S27, the reproduction control unit 111 executes reproduction control so as to play the video in fast forward up to the image in which the main subject is at the double-tapped position and start a regular video reproduction starting with the image in which the main subject is at the double-tapped position (see FIGS. 5A and 5B).

In the step S28, the reproduction control unit 111 executes reproduction control so as to play the video in reverse to the image in which the main subject is at the double-tapped position and begin a regular video reproduction starting with the image in which the main subject is at the double-tapped position (see FIGS. 6A and 6B).

If, on the other hand, it is determined in the step S25 that the touch operation performed by the user at the touch panel 14 was not a double tap operation, the operation proceeds to a step S29. In the step S29, a determination is made as to whether or not the touch operation being performed by the user at the touch panel 14 is a sustained depression lasting at least the predetermined length of time. Upon determining that the touch operation is a sustained depression lasting over the predetermined length of time or longer, the operation proceeds to the step S30, whereas upon determining that the touch operation was not a sustained operation lasting over the predetermined length of time or longer, the operation proceeds to a step 31.

In the step S30, the reproduction control unit 111 executes reproduction control so as to reproduce the image with the main subject at the position held by the user's finger for the predetermined length of time or longer as a still image (see FIGS. 7A and 7B). The image with the main subject at the position held by the user's finger over the predetermined length of time or longer is the image selected through the search executed in the step S18 in FIG. 11. In response to a specific operation performed to clear the still image reproduction, the video payback is resumed starting at the still image position and then the operation proceeds to the step S31.

In the step S31, a determination is made as to whether or not an operation for ending the video reproduction has been performed. For instance, if the user turns off the power or performs a shooting operation, it is determined that a reproduction end operation has been performed and the processing in the flowchart ends. However, upon determining that no operation for ending the video reproduction has been performed, the operation returns to the step S11 in FIG. 11.

The reproduction apparatus achieved in the embodiment described above identifies a moving main subject among subjects captured in a video image and detects a specified position that has been specified through an input operation performed while the video image is up on display at the display unit 19. It then searches for an image in which the main subject is at the specified position among the plurality of images constituting the video and designates the image as the specific image. The reproduction apparatus executes control for cued reproduction of the video starting with the specific image selected through the search. As a result, cued reproduction of the video starting with the image in which the main subject is at the specific position specified through a user input operation is achieved with ease. Since the user only needs to perform an operation for specifying the desired cued reproduction start point, better user convenience is assured.

The reproduction control unit 111 is able to reproduce the specific image as a still image. Thus, the still image with the main subject at the specified position can be brought up in the reproduction display with ease.

The reproduction control unit 111 is able to play a video clip starting with the specific image. This means that a video clip can be played through a cued reproduction starting at the desired position with ease.

Upon detecting two specified positions, i.e., a first position and a second position, the specific image search unit 115 in the reproduction apparatus achieved in the embodiment searches through images for a first image with the main subject at the first position and for a second image with the main subject at the second position. The reproduction control unit 111 then executes control so as to play a video clip constituted with a plurality of images starting with the first image and ending with the second image. Through these measures, the video clip over a specific video clip range alone can be played at the display unit with ease.

The first position and the second position can be detected as positions on the image, which correspond to a sliding operation start position and a sliding operation end position on the touch panel 14. This allows the user to easily specify a desired video clip within the video simply by sliding his finger over the touch panel 14.

If the image in which the main subject is at the first position precedes the image in which the main subject is at the second position in the video shooting time sequence, the reproduction apparatus achieved in the embodiment plays the video clip constituted with the plurality of images including the first image, the second image and the images in between, along the forward direction. If the image in which the main subject is at the first position follows the image in which the main subject is at the second position in the video shooting time sequence, the reproduction apparatus plays the video clip constituted with the plurality of images including the first image, the second image and the images in between, along the reverse direction. Thus, reverse reproduction can be achieved as easily as forward reproduction.

In addition, based upon the positions taken up by the main subject in the plurality of images constituting the video, the main subject movement locus is created and the movement locus thus created can be superimposed at the corresponding position on the video being played. As a result, the user is able to specify with ease a position that the main subject is to pass through or the main subject has passed through.

It is to be noted that while the embodiment has been described on the assumption that the processing executed in the reproduction apparatus is hardware processing, this invention is not limited to such structural particulars. For instance, this invention may be adopted in conjunction with software processing executed in a computer. Such a computer should include a CPU, a main storage device such as a RAM and a computer-readable storage medium having stored therein a program enabling execution of all or part of the processing described above. In this description, the program will be referred to as a reproduction program. Information processing·arithmetic processing executed by the CPU based upon the reproduction program read out from the storage medium will be similar to that executed in the reproduction apparatus described earlier.

The computer-readable recording medium used in such an application may be, for instance, a magnetic disk, a magneto-optical disk, a CD-ROM, a DVD-ROM or a semiconductor memory. In addition, the reproduction program may be distributed to a computer via a communication network and the computer, having received the reproduction program thus delivered, may execute the reproduction program.

This invention is not strictly limited to the specific particulars of the embodiment described above and may be otherwise embodied by modifying some of the structural components having been described in reference to the embodiment without departing from the spirit of the embodiment. In addition, various inventions may be achieved through optimal combination of the plurality of structural components disclosed in the embodiment. For instance, some of the structural components described in reference to the embodiment may be omitted and, in such a case, the spirit of this invention will remain intact.

While the embodiment has been described by assuming that the camera equipped with the reproduction apparatus is a digital camera, this invention is not limited to this example and it may be adopted in conjunction with any cameras with a video reproduction function, including a video camera, a movie camera and a built-in camera included in a portable telephone, a PDA (personal digital assistant) unit or a game console.

The relationships between various types of cued reproduction operations and the corresponding touch operations simply represent examples and this invention is in no way limited to these examples. For instance, while a still image with the main subject at a position held with the user's finger over a significant length of time is brought up on display in response to a sustained depression in the embodiment described earlier, control may be executed so as to bring up a still image display in response to a different type of touch operation.

The present invention may be adopted in a structure that does not include the touch panel 14. In such a case, an arrow icon may be displayed together with the video at the display unit 19, so as to allow the user to specify a cued reproduction start point by moving the arrow icon to a specific position through a cross button operation or a touch pad operation.

While the main subject movement locus is created upon completion of the video reproduction through the end and the main subject movement locus thus created is displayed at the display unit 19 in the example described earlier, a past movement locus may be obtained at the time of each video reproduction and the past movement locus may be displayed at the display unit 19 each time.

This application claims priorities based on JP2010-292331, filed with the Japan Patent Office on Dec. 28, 2010, and JP2011-35741, filed with the Japan Patent Office on Feb. 22, 2011, the entire contents of which are incorporated into this specification by reference.

What is claimed is:

1. A reproduction apparatus, comprising:
    a reproduction control unit that controls reproduction of a video image;
    a display unit at which the video image being played is displayed;
    a touch panel unit disposed at the display unit;
    a main subject identifying unit that identifies a moving main subject among subjects captured in the video image;
    an operation detection unit that detects an input operation performed at the touchpad unit;
    a position detection unit that detects, respectively as a first position and a second position, a start position and an end position of a sliding operation performed as the input operation along a direction in which the main subject moves in the video image displayed at the display unit;
    a specific image search unit that searches for images within a range starting with a first image in which the main subject is at the first position and ending with a second image in which the main subject is at the second position, among images constituting the video image; and
    a storage unit that sequentially stores positions of the main subject when the video image is played after the main subject is identified, wherein:
    the reproduction control unit, which executes control so as to play a video image over a range between the first position and the second position, ensures that the video image constituted with the plurality of images starting with the first image and ending with the second image is played along a forward direction if the first image with the main subject at the first position precedes the second image with the main subject at the second position in a video shooting time sequence and that the video image constituted with the plurality of images starting with the first image and ending with the second image is played along a reverse direction if the first image with the main subject at the first position follows the second image with the main subject at the second position in a video shooting time sequence;
    the position detection unit creates a movement locus on which the main subject moves based upon positions of the main subject in the plurality of images constituting the video image; and
    the reproduction control unit executes control as so to superimpose the movement locus at a corresponding position in the video image being played when the movement locus on which the main subject is identified is already created.

2. The reproduction apparatus as defined in claim 1, wherein:
    the reproduction control unit repeatedly plays, either along the forward direction or the reverse direction, the video image constituted with the plurality of images starting with the first image and ending with the second image.

3. An image-capturing apparatus, comprising:
    an image-capturing unit that generates video image data by capturing images; and
    the reproduction apparatus as defined in claim 2.

4. The reproduction apparatus as defined in claim 1, wherein:
    the main subject identifying unit identifies a most dynamic subject among the subjects having been captured as the main subject.

5. An image-capturing apparatus, comprising:
    an image-capturing unit that generates video image data by capturing images; and
    the reproduction apparatus as defined in claim 4.

6. An image-capturing apparatus, comprising:
    an image-capturing unit that generates video image data by capturing images; and
    the reproduction apparatus as defined in claim 1.

7. The reproduction apparatus as defined in claim 1, wherein the first and second positions are positions in an image currently displayed on the display unit when the sliding operation is performed.

8. The reproduction apparatus as defined in claim 1, wherein the first and second positions are physical positions on the display unit.

* * * * *